Sept. 6, 1949.    R. MILLRAY    2,481,327
BICYCLE BRAKE
Filed Dec. 19, 1947    2 Sheets-Sheet 1
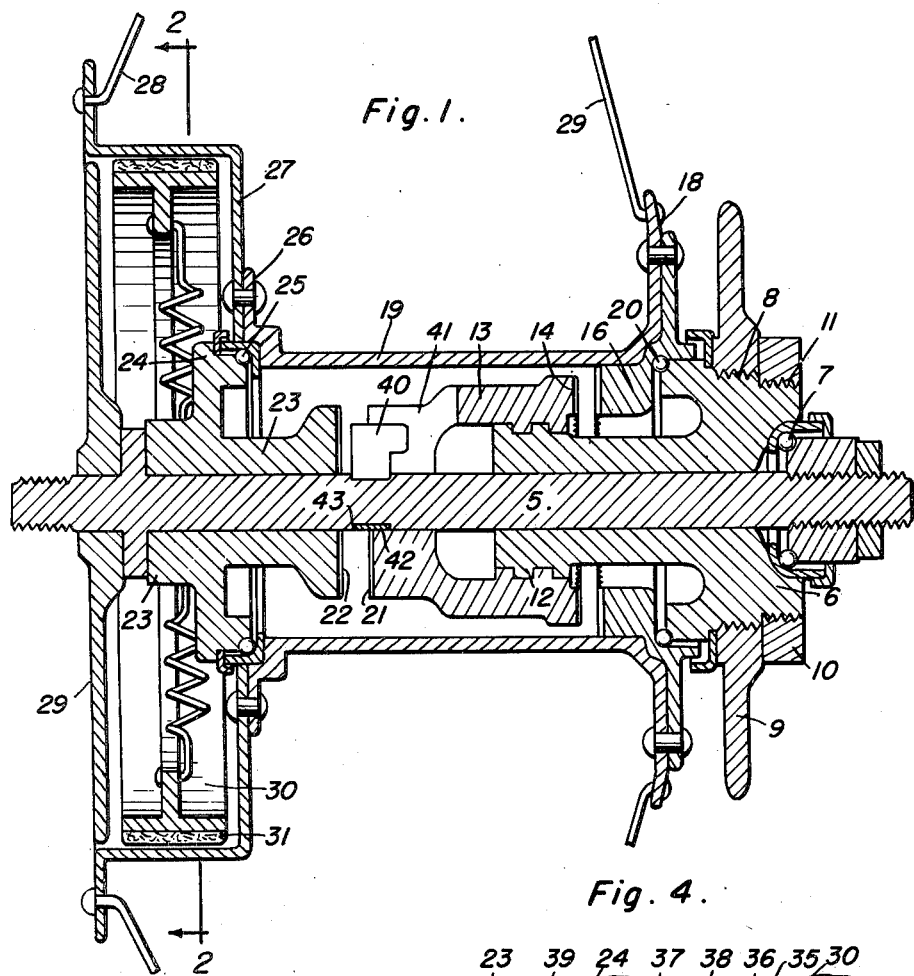
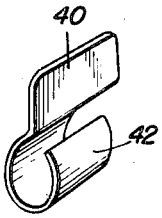
Inventor
Robert Millray
By Clarence A. O'Brien
and Harvey B. Jacobson
Attorneys Sept. 6, 1949.   R. MILLRAY   2,481,327
BICYCLE BRAKE Filed Dec. 19, 1947   2 Sheets-Sheet 2

Robert Millray
INVENTOR.

BY
Attorneys

Patented Sept. 6, 1949

2,481,327

UNITED STATES PATENT OFFICE 2,481,327

BICYCLE BRAKE

Robert Millray, Santa Monica, Calif.

Application December 19, 1947, Serial No. 792,693

2 Claims. (Cl. 192—6)

1

The present invention relates to new and useful improvements in brakes and more particularly to brakes for bicycles.

An important object of the invention is to provide a heavy duty brake for use with bicycles equipped with motors and which still retain the use of the regular bicycle pedals.

A further object of the invention is to provide a bicycle brake including a brake drum secured to the hub of the wheel and with which brake bands are movable to provide a braking action by a reverse movement of the pedals of the bicycle.

A still further object is to provide a device of this character of simple and practical construction, which is efficient and reliable in operation, relatively inexpensive to manufacture and install in operative position and which otherwise is well-adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view of the hub of the drive wheel of a vehicle and showing the brake mechanism provided for the wheel in accordance with the present invention;

Figure 4 is a fragmentary sectional view of the brake taken substantially on the line 4—4 of Figure 2; and Figure 5 is a perspective view of the key for the sliding clutch and brake actuating collar.

Figure 2:
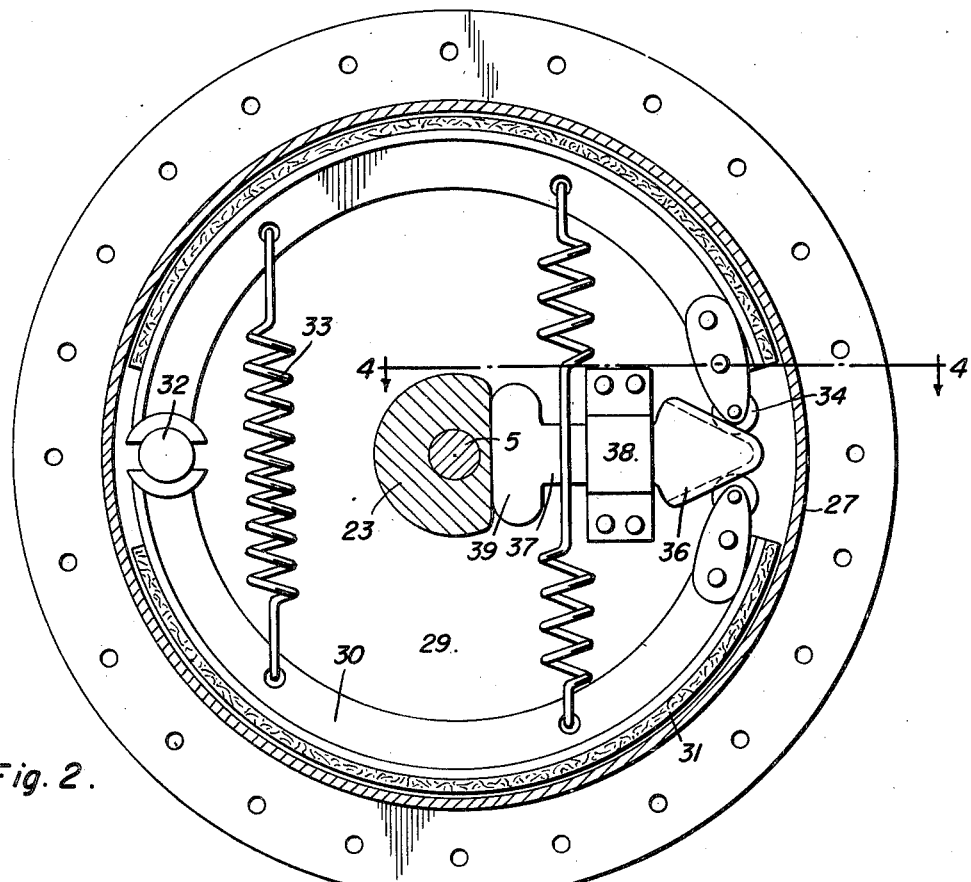
Figure 2 is a vertical sectional view through the brake taken substantially on the line 2—2 of Figure 1.
Figure 3:
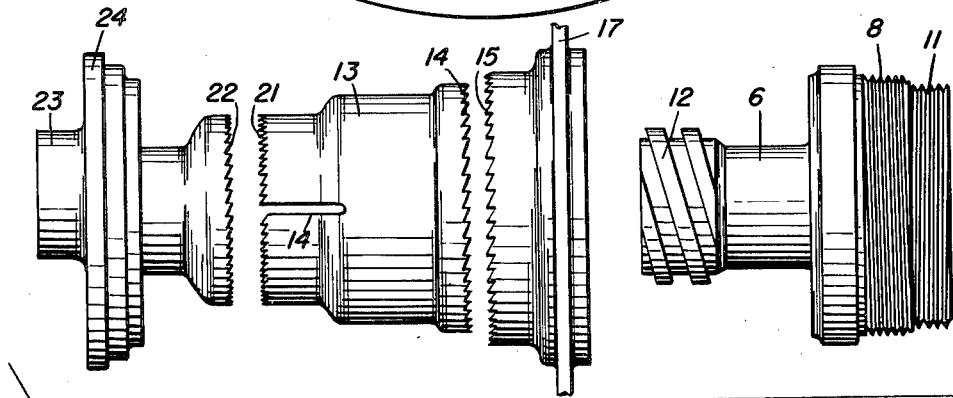
Figure 3 is a group side elevational view of the clutch and brake elements.

Referring now to the drawings in detail wherein for the purpose of illustration I have disclosed a preferred embodiment of the invention, the numeral 5 designates an axle suitably secured to the frame of a bicycle and on one end of which a sprocket support 6 is journaled by means of a ball-bearing assembly 7.

The outer end of the sprocket support 6 is threaded as shown at 8 and on which a sprocket 9 is threadedly engaged and secured in position thereon by a nut 10 threaded on the reduced outer end portion 11 of the sprocket support. The inner end of the sprocket support 6 is formed with a feed screw 12 engaging an internally screw

2 threaded clutch and brake collar 13 slidably mounted on the axle 5.

One end of the collar 13 is provided with clutch teeth 14 engageable with similar clutch teeth 15 at the inner surface of a clutch ring 16 provided at its outer end with a flange 17 secured to the flange 18 at one end of a wheel hub 19. A ball-bearing assembly 20 is positioned between the sprocket support 6 and clutch ring 16 to rotatably support one end of the hub 19 on the sprocket support.

The opposite end of the collar 13 is also provided with clutch teeth 21 engageable with similar clutch teeth 22 at the inner end of a brake operating cam 23 rotatably supported on the axle. The cam 23 includes an annular flange 24 rotatably supporting the other end of the wheel hub 19 with a ball-bearing assembly 25 therebetween. The adjacent end of the hub 19 is provided with a flange 26 to which a brake drum 27 is secured, the spokes 28 at one side of the wheel being secured to the outer edge of the brake band and the spokes 29 at the other side of the wheel being secured to the flange 18 at the opposite end of hub 19.

The outer side of the brake drum 27 is closed by a cover plate 29 which is suitably secured in a stationary position to a part of the frame of the bicycle.

A pair of brake shoes 30 are positioned in the brake drum 27 with brake linings 31 on the outer surface of the shoes, one end of the shoes being rockable on a pin 32 carried by the inner face of cover plate 29. Springs 33 connect the brake shoes to each other to hold the brake linings out of engagement with the brake drum 27.

Rollers 34 are journaled at the free end of the brake shoes 30 to travel in grooves 35 at the opposite sides of a spear head 36 working between the rollers and formed at the outer end of a plunger 37 slidable in a guide 38 on the inner face of cover plate 29.

The inner end of plunger 37 is provided with a flat head 39 engaged by the outer end of cam 23.

The collar 13 is held against rotation on axle 5 by means of a key 40 slidably-received in a slot 41 at one end of the collar and formed with a resilient clip 42 frictionally held against rotation in a reduced portion or groove 43 in the axle, the groove holding the key against sliding movement on the axle.

In the operation of the device, the sprocket 9 is connected to the usual bicycle pedals and upon rotation of the sprocket in a forward driving direction the screw 12 will move the collar 13 on the axle toward the clutch ring 16 to engage the teeth of the collar with the ring and thus connect the wheel to the sprocket in driving engagement.

A reverse rotation of sprocket 9 slides collar 13 in a reverse direction to release collar 13 from ring 16 and engage collar 13 with the teeth 22 of cam 23 to thus rotate the cam in a manner to apply brake shoes 30.

The frictional engagement of clip 42 with axle 5 will hold the key 40 and collar 13 against rotation on axle 5 when the collar is disengaged from either clutch ring 16 or cam 23, but will permit rotation of the collar when engaged with either the clutch ring or cam.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a bicycle brake and clutch, a wheel hub, a clutch ring secured to one end of the hub, a brake drum secured to the other end of the hub, a sprocket support rotatably supporting the first-named end of the hub and a cam rotatably supporting the second-named end of the hub, a collar movable longitudinally in the hub for alternate operating engagement with the clutch ring and cam, a pair of brake shoes in the drum, a plunger slidably carried by the drum and actuated by the cam, a spear-shaped head on the plunger engaging the brake shoes to apply the brake, and means operatively connecting the sprocket support to the collar for opposite sliding movement of the collar, said means comprising a screw feed between the sprocket mounting and the collar.

2. In a brake mechanism for bicycles including an axle, a brake drum carried by said axle at one end, a pivot pin fixed in said drum, a pair of brake shoes mounted in said drum and having first and second end portions, resilient means connecting and urging said brake shoes toward each other, means carried by the first end portions of said brake shoes embracing said pivot pin for rocking movement of the brake shoes about said pivot pin as a fulcrum, anti-friction means carried by the second end portions of said brake shoes, a slidable operating member carried by said drum and having a spear-shaped end portion slidably contacting the anti-friction means to urge the brake shoes from each other against action of said resilient means, and a cam journaled on the axle and having a flat surface, said slidable operating member having a flat head abutting the flat surface of said cam.

ROBERT MILLRAY.

REFERENCES CITED

The following references are of record in the file of this patent:

UNITED STATES PATENTS

| Number | Name | Date |
| --- | --- | --- |
| 709,479 | Glouer | Sept. 23, 1902 |
| 989,617 | Lester | Apr. 18, 1911 |
| 1,158,751 | Van Deren | Nov. 2, 1915 |
| 1,872,796 | Norton | Aug. 23, 1932 |
| 2,091,586 | Glacy | Aug. 31, 1937 |

FOREIGN PATENTS

| Number | Country | Date |
| --- | --- | --- |
| 20,597 | Great Britain | Sept. 24, 1904 |
| 376,640 | Great Britain | July 14, 1932 |